Sept. 8, 1959                R. HUBER                   2,903,599
  POWER PLANTS COMPRISING FREE-PISTON GAS GENERATORS ADAPTED TO
     SUPPLY HOT POWER GAS TO A GAS ENGINE SUCH AS A GAS TURBINE
                     Filed April 18, 1958
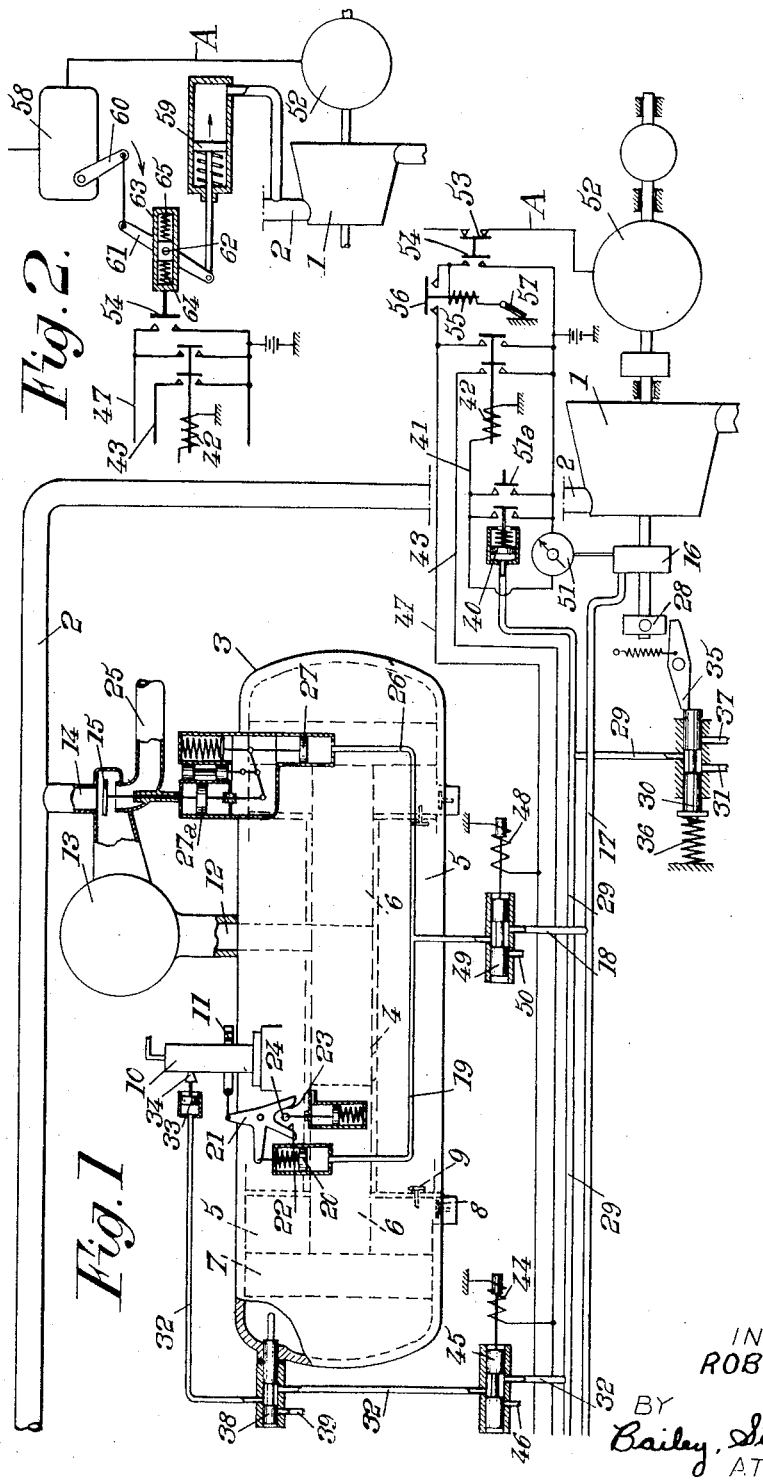
INVENTOR
ROBERT HUBER
BY
Bailey, Stephens & Huettig
ATTORNEYS

United States Patent Office 2,903,599
Patented Sept. 8, 1959

2,903,599

POWER PLANTS COMPRISING FREE-PISTON GAS GENERATORS ADAPTED TO SUPPLY HOT POWER GAS TO A GAS ENGINE SUCH AS A GAS TURBINE

Robert Huber, Bellevue, France, assignor to Societe d'Etudes et de Participations Eau, Gaz, Electricite, Energie, S.A., Geneva, Switzerland Application April 18, 1958, Serial No. 729,303

Claims priority, application Germany April 30, 1957

15 Claims. (Cl. 290—4)

This invention relates to power plants comprising free-piston gas generators adapted to supply hot power gas to a gas engine such as a gas turbine.

The term gas generator is used here to designate a machine comprising a compressor element and a driving element, the compressed air from the compressor element being used, at least partly, to scavenge and to feed the driving element, and the power gas issuing from the exhaust ports of the driving element consisting of a mixture of incompletely expanded combustion gases and of excess air.

It is known to provide in such power plants control means which upon a sudden and large decrease in the load of the gas engine open an orifice through which gas may exhaust from the gas generators. It has also been found of advantage to cut off the gas generators from the power gas conduit extending to the gas engine.

A first object of this invention is to provide a power plant embodying one or more free-piston gas generators and a gas engine, and having control means adapted upon a sudden and large decrease in the load of the gas engine to open an exhaust orifice for gas from the gas generators, wherein the control means are so arranged as to simultaneously cut off the gas engine from the said gas generators at least for a short period.

Another object of this invention is to provide in a power plant of the kind specified means whereby the fuel control member of each free-piston gas generator is simultaneously returned to the position corresponding to minimum piston stroke.

Assuming the gas engine is in the form of a gas turbine driving an electric generator, the limit case of a sudden and large load decrease is met with when the electric generator is disconnected from the electric power line by a circuit breaker. In such a case according to a further feature of this invention the circuit breaker is caused to immediately close an electric circuit which operates the aforesaid control means; this circuit being thereafter reopened after a predetermined time interval (of a few seconds). During this short time the speed of the turbine may adjust itself to the value corresponding to no-load conditions, whereby after both the gas generators and the gas turbine have been brought to their idle regime, power gas may again be supplied from the gas generators to the turbine in an amount corresponding to idle running.

According to another feature of this invention in a power plant of the kind specified the gas engine drives a safety regulator which, when the engine speed exceeds a permissible maximum, delivers a control pulse adapted to cut off fuel supply to the motor cylinders of the gas generators whereby the latter are stopped, the said regulator also actuating means which at the same time open an exhaust orifice for the power gases from the gas generators and cut off the latter from the gas engine.

In the known gas generator power plants provided with an overspeed safety device, the control pulse is transmitted hydraulically or pneumatically from the pulse delivering regulator to the fuel injection pump of the gas generators. Owing to the length of the piping which connects the regulator, generally disposed close to the gas turbine, with the injection pumps of the gas generators, the transmission of the pulse often requires a considerable time.

According to still another feature of this invention this is obviated by so arranging the safety regulator associated to the gas turbine that it produces in addition to the hydraulic or pneumatic control pulse an electric control pulse which actuates a member disposed close to each gas generator, the said control member in turn acting on the fuel supply to the gas generator in the same way as the hydraulic or pneumatic pulse delivered by the safety regulator. This arrangement not only obviates the above explained inconvenience, but also increases reliability, since two different pulses are operative in parallel whereby should one fail, the other would still stop the gas generators.

In the annexed drawings:

Fig. 1 illustrates diagrammatically a power plant according to the invention, whilst.

Fig. 2 is a view of a modification of part of Fig. 1.

Referring to the installation shown in Fig. 1, it is assumed that a gas turbine 1 is fed by a plurality of free-piston gas-generators which deliver power gases to a common power gas conduit 2. Only one such gas-generator has been diagrammatically illustrated in Fig. 1, 3 designating the outer casing thereof. Disposed in casing 3 is an internal combustion cylinder 4 (shown in broken lines) having at both ends compressor cylinders 5 in the known manner. Two engine pistons 6, each rigidly secured to a compressor piston 7, operate in opposition in cylinder 4. Each compressor piston 7 divides the associated compressor cylinder 5 into two chambers, the innermost one, which has an inlet valve 8 and a delivery valve 9, forming the compressor cylinder proper, while the outermost one forms a pneumatic energy accumulator of the kind conventional in free-piston engines, a compressed air cushion serving to return the free pistons to their inner dead centre position. The movements of the two free pistons 6, 7 are synchronized, also in conventional manner.

Conveniently, the driving element of the gas-generator, which element comprises engine cylinder 4 and engine pistons 6, operates on the two-stroke diesel cycle, that is the injected fuel is ignited by heat generated by compression of the supply air between the oppositely moving driving pistons 6 in the cylinder 4 when the said pistons 6 move inwards.

Fuel is injected by a fuel pump 10 and the quantity of fuel injected per cycle is controlled conventionally, as for instance through a toothed rack 11 which rotates the fuel injection pump piston about its axis so that the quantity of fuel injected per cycle varies with the angular position of the injection pump piston.

The gases issuing from the driving cylinder 4, which consist of the excess scavenging air of cylinder 4 and of the incompletely expanded combustion gases thereof, pass through a conduit 12 into an intermediate reservoir 13 and thence, by way of a conduit 14 controllable by a valve 15, into the main driving gas conduit 2 which extends to turbine 1.

In normal operation the driving gas generator is merely controlled by adjusting the aforesaid control member 11, such adjustment being performed in dependence upon the speed regulator 16 of turbine 1. Regulator 16 determines in a conduit 17 containing a pressure fluid a pressure which increases as the speed of turbine 1 decreases. This pressure is transmitted through conduits 18, 19 to a piston 20 which is connected to control member 11 by means of a cranked lever 21 and which displaces control member 11 in order to increase the quantity of fuel injected as the pressure produced by the speed regulator 16, and transmitted to piston 20, increases. However, in order that the movements of control member 11 may remain within the operating limits of the gas-generator, the cranked lever 21 is provided with two cam-like control surfaces 22, 23 between which is disposed an abutment 24, the position of which can be varied by the operating pressure of the gas-generator or by some other pressure which varies in accordance with the said operating pressure. Hence co-operation of abutment 24 with cam surfaces 22 and 23 determines in known manner for each operating pressure the limits within which member 11 controlling the fuel supply to the gas-generator may be displaced in dependence upon the speed of turbine 1, the free pistons performing their minimum permissible stroke when abutment 24 abuts cam surface 22 and the said pistons performing their maximum permissible stroke when abutment 24 abuts cam surface 23.

Valve 15 closes conduit 14 when the gas-generator is idling and simultaneously fully opens a conduit 25 through which the amount of power gas produced when the gas-generator is started can exhaust to atmosphere. When the plant is lightly loaded, valve 15 takes up an intermediate position (such as the position shown in Fig. 1) for which some of the gases produced by the gas-generator pass into the main power gas conduit 2, while excess of gas which turbine 1 cannot absorb passes through conduit 25 to atmosphere. A predetermined average loading must be reached before valve 15 fully opens conduit 14 and fully closes conduit 25 so that all the gases produced by the gas-generator flow through conduit 2 to turbine 1.

Valve 15 is controlled in the manner hereinbefore described by the pressure fluid, the pressure of which is controlled by the main regulator 16 of turbine 1. This pressure fluid, which is led to the gas-generator through conduits 17 and 18, passes through a conduit 26 below a piston 27 which actuates valve 15 either directly or through the medium of a servo-piston 27a. If the speed of turbine 1 suddenly increases, as for instance because its load suddenly decreases to a considerable extent, the turbine may race if the control devices hereinbefore described and effective under normal operative condition fail to function satisfactorily. Another safety device is therefore provided which is operated by the main regulator 16, or, even better, by a particular safety regulator 28, as soon as turbine 1 exceeds its maximum permissible speed. When the safety regulator 28 operates, it immediately cuts off fuel supply to the gas-generator so that the same stops and all further supply of gas to the turbine ceases. The safety regulator 28 acts upon the safety control member adapted to interrupt fuel supply by way of a conduit 29 which conveys a pressure fluid, such as oil under pressure. The safety regulator 28 and the members controlled thereby may be of the kind described in detail in German patent specification No. 954,170.

As long as the safety regulator 28 has not become operative, conduit 29 is connected, for instance through the medium of a slide valve 30, to a pressure fluid source 31 so that pressure fluid flows therefrom through conduit 29 into a branch conduit 32 which extends to each gas-generator and which supplies pressure fluid to a piston 33, which piston, while under pressure, retains at the closed position an outlet valve 34 fitted to the pump 10. However, as soon as the safety regulator 28 becomes operative, when turbine 1 exceeds its maximum permissible speed, a lever 35 is swung outwards. Lever 35 previously locked slide valve 30 at a position for which the latter was connecting the pressure fluid source 31 with conduit 29, but, as soon as lever 35 is swung aside, a spring 36 acts upon slide valve 30 and so displaces the latter (to the right in the drawing) that communication between conduit 29 and the pressure fluid source 31 is interrupted, conduit 29 being connected to an outlet conduit 37. As a result, pressure drops in conduits 29 and 32 and the outlet valve 34 opens whereby the fuel pump ceases to supply fuel to the engine cylinder of the gas-generator.

A slide valve 38 is disposed in a per se known manner in conduit 32 to separate that branch of the latter, which extends to piston 33, from the remainder of the said conduit 32, and to connect the last-mentioned-branch of conduit 32 with an outlet conduit 39 when the pistons of the gas-generator 6, 7 exceed their maximum permissible outward stroke. In this case, therefore, the gas-generator is stopped immediately by interruption of the fuel supply to its engine cylinder.

It should be pointed out that slide valve 38 is operative only on the gas-generator whose pistons have effected an excessive outward stroke; consequently, in a plant having a plurality of gas-generators slide valve 38 does not affect the operation of the other gas-generators. If the speed of turbine 1 becomes excessive, with the result that the safety regulator 28 operates, all the gas-generators connected with conduit 29 are stopped.

Owing to the relatively considerable length of the conduits 29 which connect slide valve 30 and the outlet aperture 37 controlled thereby with the branch conduit 32 associated to each gas-generator, there may be some delay between the instant at which slide valve 30 is operated by the safety regulator 28 and the instant at which the resulting pressure decrease opens the outlet valve 34 of fuel pump 10, and such delay may mean that the speed of turbine 1 becomes excessive even though the safety device operates satisfactorily. As shown in Fig. 1, therefore, the pressure drop in conduit 29 operates a pressure-responsive switch 40 which is situated close to slide valve 30 or to turbine 1 and which is inserted in an electric circuit 41, closure of circuit 41 resulting, through a relay 42, in the closure of another circuit 43 which operates solenoid relay 44 which in turn controls another slide valve 45 or the like in the branch conduit 32, the said slide valve 45 connecting with an outlet aperture 46 that branch of conduit 32 which extends to piston 33, and closing that branch of conduit 32 which is connected to conduit 29. In contradistinction to slide valve 30, slide valve 45 is disposed close to the gas-generator to be stopped. It may be possible in some cases to use the same slide valve 45 to stop two adjacent gas-generators.

Since circuits 41 and 43 operate substantially simultaneously with slide valve 30, and since slide valve 45 controlled by circuits 41, 43 is situated close to the driving gas generator to be stopped, valve 34 which interrupts the fuel supply to the said generator opens substantially simultaneously with the operation of the safety regulator 28, so that delay is obviated.

The plant illustrated in Fig. 1 also has a circuit 47 to which are connected solenoid relays 48 the number of which is equal to the number of gas-generators. Each relay 48 operates a slide valve or similar control member 49 disposed in the conduit 18 which supplies the pressure fluid controlled by the main regulator 16 to the devices operating fuel supply control member 11 and valve 15. When relay 48 is operated, slide valve 49 is so moved as to cut off conduit 18 and to connect to an outlet aperture 50 the branch conduits 19 and 26 connected to the said operating devices. As a result, control member 11 is immediately moved to a position corresponding to minimum fuel injection into the engine cylinder of the gas-generator, such minimum fuel injection being just sufficient to keep the gas-generator in operation, while valve 15 moves to a position at which it closes conduit 14 and completely opens outlet conduit 25.

The relays 48 may be operated by the safety regulator 28, in which case relay 42 can be designed as shown in the drawings, that is, as a double relay which simultaneously closes circuits 43 and 47. However, relays 48 may be operated independently of the safety regulator 28 and in a manner to be more fully described hereinafter.

Should the safety regulator 28 fail to operate normally for any reason, a further safety measure is provided in the form of a speed indicator 51 which is driven by the main regulator 16, which has contacts connected in parallel with switch 40 in circuit 41 and which closes same as soon as turbine 1 exceeds the maximum permissible speed. Hence when the contacts controlled by the speed indicator 51 close, the double relay 42 is operated in the same way as when circuit 41 is closed by switch 40.

A hand switch 51a is connected in parallel with switch 40 and with the contacts controlled by speed indicator 51. Operation of hand switch 51a by the plant supervisor has the same effect as automatic closure of circuit 41 by switch 40 or by speed indicator 51.

In the plant shown in Fig. 1, it is assumed that turbine 1 drives an electric generator 52 connected to an electric power line through a circuit-breaker 53 and wiring A. If the switch or circuit-breaker is suddenly opened, the load is suddenly removed from turbine 1, the speed thereof rises considerably and the members (control member 11 and valve 15) which normally operate in association with the speed regulator 16 may not decrease the output of the gas-generators rapidly enough to prevent the turbine from reaching its maximum permissible speed and therefore from actuating the safety regulator 28, thus stopping all the gas-generators. In other words, the disconnection of the electric generator driven by turbine 1 would almost always stop the whole plant and the gas-generators would have to be re-started.

To obviate this inconvenience, circuit-breaker 53 may be so designed as to close in its tripping movement (to the left in Fig. 1) a switch 54 disposed in circuit 47 in parallel with the double relay 42. Closure of switch 54 causes simultaneous closure of switch 56 which is in series with switch 54 and which is controlled by relay 55. The circuit of relay 55 is provided with an automatic time switch, as for instance a bimetallic strip 57, which, for example when the bimetallic strip is heated, opens the relay circuit and therefore switch 56 after a time interval of a few sseconds, for instance ten seconds.

Hence if circuit breaker 53 is tripped, slide valve 49 is operated simultaneously through the medium of circuit 47 and relay 48 and, being close to each gas-generator, it allows the pressure fluid to escape from the branch conduits 19 and 26 without delay and therefore moves control member 11 to the position at which the cam surface 22 abuts abutment 24, this position corresponding to minimum stroke of the gas-generators, while valve 15 simultaneously cuts off the associated gas-generator from the collector conduit 2 and connects same with the outlet conduit. After a few seconds, for instance ten seconds, circuit 47 is reopened automatically and the branch conduits 19 and 26 of each gas generator are reconnected with conduit 17, so that the pressure pulses initiated by the main regulator 16 of the turbine may again act upon the control member 11 and the valve 15 of each gas-generator. Experience has demonstrated that by these means turbine 1 can be prevented, when the electric generator is suddenly disconnected, from reaching the speed at which the safety regulator 28 trips and that the turbine speed drops very rapidly to the idling value.

In the installation shown in Fig. 1 it was assumed that the sudden decrease in turbine load was produced by disconnecting the electric generator, but Fig. 2 illustrates a modification by means of which the gas-generators may be disconnected from the gas turbine for a short period and the fuel supply may be limited by the cam surface 22 bearing against the abutment 24, irrespective of the reason for which the turbine load may suddenly decrease. Referring to Fig. 2, it is again assumed that the turbine 1 drives an electric generator 52. A sudden drop in turbine load is detected by comparing the adjusting movements performed by a wattmeter relay 58 with the adjusting movements of a piston 59 actuated by the power gas pressure. The adjusting movements produced by the wattmeter relay are, for instance, the swinging movements of a lever 60. The latter and the piston 59 are connected to the ends of a rocking lever 61, the fulcrum 62 of which is movable in a slide 63 against springs 64, 65.

If the load of the turbine or electric generator varies slowly, the movements of lever 60 and of piston 59 match one another so that fulcrum 62 remains somewhere near the centre of slide 63. It should be noted that, if the load decreases, the swinging movement of lever 60 and the displacement of piston 59 take place in the direction indicated by the arrows in the drawing.

If the load decreases suddenly, the movement of lever 60 leads the movement of piston 59 considerably. As a result, fulcrum 62 is displaced to the left and, as it moves, it actuates switch member 54 inserted in circuit 47 to close same. If after some time the pressure in the power gas conduit reaches a value corresponding to the reduced gas supply and if piston 59 has been displaced correspondingly, switch 54 reopens. The manner in which switch 54 is closed and opened is the same as for the closure and opening of switches 54, 56 described with reference to Fig. 1.

I claim:

1. In a power plant embodying free-piston gas generators to produce power gases under pressure and a gas engine to which said power gases are supplied by said free-piston gas generators, a speed regulator driven by said gas engine to control said free-piston gas generators; and a temporarily acting auxiliary control device responsive to a sudden large decrease in the load of said gas engine, said auxiliary control device at the same time, for a short period and irrespective of said speed regulator reducing fuel supply to said free-piston gas generators, cutting off said gas engine from said free-piston gas generators, and allowing power gases from same to exhaust to atmosphere.

2. A power plant as claimed in claim 1, said auxiliary control device comprising means responsive to the pressure of the power gases supplied to said gas engine; means responsive to the power delivered by said gas engine; a switch responsive to the difference between the action of said pressure responsive and power responsive means, said switch closing whenever the power delivered by said gas engine is suddenly decreased; and means actuated by closure of said switch to reduce fuel supply to said free-piston gas generators, to cut off said gas engine from said free-piston gas generators, and to allow power gases from same to exhaust to atmosphere.

3. In a power plant embodying free-piston gas generators to produce power gases under pressure, a gas engine to which said power gases are supplied by said free-piston gas generators, and an electric generator driven by said gas engine and connected with an electric power line; a speed regulator driven by said gas engine to control said free-piston gas generators; a circuit breaker disposed between said electric generator and said electric power line; and a temporarily acting auxiliary control device operated by said circuit breaker when same opens to disconnect said electric generator from said electric power line, said auxiliary control device at the same time, for a short period and irrespective of said speed regulator reducing fuel supply to said free-piston gas generators, cutting off said gas engine from said free-piston gas generators, and allowing power gases from same to exhaust to atmosphere.

4. In a power plant comprising free-piston gas generators to produce power gases under pressure and a gas engine to which said power gases are supplied by said free-piston gas generators, fuel injection means associated to each of said free-piston gas generators; a speed regulator driven by said gas engine to control said free-piston gas generators, said speed regulator supplying a fluid under a pressure which decreases as the speed of said gas engine increases; fluid operated means acting on each of said fuel injection means to reduce fuel supply to each of said free-piston generators as the fluid pressure supplied to said fluid operated means decreases; fluid lines extending from said speed regulator to each of said fluid operated means to convey pressure fluid from said speed regulator to said fluid operated means; a two-way valve inserted in each of said fluid lines, said valve, when actuated, cutting off from said speed regulator each of said fluid operated means and connecting same to a low pressure to cause reduction of fuel supply to said free-piston gas generators; and a temporarily acting auxiliary control device responsive to a sudden large decrease in the load of said gas engine, said auxiliary control device actuating for a short period said two-way valves.

5. A power plant as claimed in claim 4, said gas engine driving an electric generator connected with an electric power line through a circuit breaker, and said auxiliary control device comprising means actuated by said circuit breaker when same opens, said last-named means in turn actuating said two-way valve.

6. A power plant as claimed in claim 4, said gas engine driving an electric generator connected with an electric power line through a circuit breaker, and said auxiliary control device comprising an electromagnetic actuating element to actuate said two-way valve; a relay switch to actuate said electromagnetic actuating element; time responsive means to re-open said relay switch a short time after same has been closed; and an electric switch associated to said circuit breaker to actuate said relay switch when said circuit breaker opens.

7. A power plant as claimed in claim 4, means responsive to operating pressure of each free-piston gas generator to limit reduction of fuel supply to same to the value corresponding to idle running conditions.

8. In a power plant comprising free-piston gas generators to produce power gases under pressure and a gas engine to which said power gases are supplied by said free-piston gas generators; fuel injection means associated to each of said free-piston gas generators; a two-way gas valve device between said gas engine and each of said free-piston gas generators to permit passage of gas from same either to said gas engine or to atmosphere; fluid operated fuel supply control means acting on each of said fuel injection means to reduce fuel supply to each of said free-piston gas generators as fluid pressure supplied to said fluid operated fuel supply control means decreases; fluid operated gas control means acting on each of said two-way gas valve device to close gas passage to said gas engine and to open gas exhaust to atmosphere as fluid pressure supplied to said fluid operated gas control means decreases; a speed regulator driven by said gas engine to control said free-piston gas generators, said speed regulator supplying a fluid under a pressure which decreases as the speed of said gas engine increases; fluid lines extending from said speed regulator to the fluid operated fuel supply control means and to the fluid operated gas control means of each of said free-piston gas generators; a two-way fluid valve inserted in each of said fluid lines, said two-way fluid valve, when actuated, cutting off from said speed regulator the fluid operated fuel supply control means and the fluid operated gas control means of each of said free-piston gas generators and connecting same to a low pressure to cause reduction of fuel supply to said free-piston gas generators and reduction of power gas supply from said free-piston gas generators to said gas engine; and a temporarily acting auxiliary control device responsive to a sudden large decrease in the load of said gas engine, said auxiliary control device actuating for a short period said two-way valves.

9. In a power plant a free-piston gas generator adapted to produce power gases under pressure, said free-piston generator having an engine cylinder; fuel supply means associated to said free-piston gas generator to supply fuel into said engine cylinder; a gas engine to which said power gases are supplied by said free-piston gas generator; emergency fluid operated means associated to said fuel supply means to cut off fuel supply to said free-piston gas generator, said fluid operated means being responsive to a drop of fluid pressure; a source of fluid under pressure to maintain inoperative said fluid operated means; a fluid line to connect said source of fluid under pressure with said fluid operated means; a first two-way valve disposed in said fluid line in the vicinity of said gas engine, said first two-way valve, when actuated, cutting off from said source said fluid operated means and connecting same with a low pressure; a second two-way valve disposed in said fluid line in the vicinity of said free-piston gas generator, said second two-way valve, when actuated, also cutting off from said source said fluid operated means and connecting same with a low pressure; an overspeed safety control device associated to said gas engine to actuate said first two-way valve when the speed of said engine exceeds a pre-determined value; electromagnetic means to actuate said second-named two-way valve; and switch means actuated by said overspeed safety control device when same actuates said first two-way valve, said switch means in turn actuating said second two-way valve.

10. A power plant as claimed in claim 9, said first two way valve being urged towards its operative position, but being retained at its inoperative position by releasablee means, and said overspeed safety control device releasing said releasable means when the speed of said gas engine exceeds said pre-determined value.

11. A power plant as claimed in claim 9, said switch means comprising a relay and said gas engine having a speed indicator which, when the speed of said gas engine exceeds a pre-determined value, actuates electric contacts which in turn actuate said relay.

12. A power plant as claimed in claim 9, said switch means comprising a pressure switch responsive to a drop of pressure in said fluid line.

13. The method of operating a power plant comprising free-piston gas generators and a gas engine to which power gases under pressure are supplied by said free-piston generators, said gas engine having a speed regulator to control operation of said free piston gas generators, which method consists, when the load of said gas engine is suddenly reduced, first, in at once, at the same time, and irrespective of said speed regulator, reducing fuel supply to said free-piston gas generators to a value substantially corresponding to idle running conditions, disconnecting said gas engine from said free piston gas generators, and causing the power gases from said free-piston gas generators to exhaust to atmosphere; and, second, after a short period of time in reestablishing normal operating conditions under control of said speed regulator.

14. In a method as claimed in claim 13, the step of detecting a sudden decrease in the load of said gas engine by comparing the power delivered by said gas engine with the pressure of the power gases supplied to said gas engine by said free-piston gas generators.

15. The method of operating a power plant comprising free-piston gas generators, a gas engine to which power gases under pressure are supplied by said free-piston gas generators, said gas engine having a speed regulator to control said free-piston gas generators, and an electric generator driven by said gas engine and connected to an electric power line through a circuit breaker, which method consists, when said circuit breaker opens, first in at once, at the same time and irrespective of said speed regulator, reducing fuel supply to said free-piston gas generators to a value substantially corresponding to idle running conditions, disconnecting said gas engine from said free-piston generators, and causing the power gases from said free-piston geenerators to exhaust to atmosphere; and, second, after a short period of time in re-establishing normal operating conditions under control of said speed regulator.

References Cited in the file of this patent

UNITED STATES PATENTS

| | | |
|---|---|---|
| 2,200,892 | Pateras-Pescara | May 14, 1940 |
| 2,253,530 | Pateras-Pescara | Aug. 26, 1941 |
| 2,355,177 | Pateras-Pescara | Aug. 8, 1944 |
| 2,472,934 | Beale | June 14, 1949 |
| 2,474,697 | Schwendner | June 28, 1949 |
| 2,745,246 | Huber | May 15, 1956 |
| 2,770,943 | Beale | Nov. 20, 1956 |